United States Patent
Oka et al.

(10) Patent No.: US 10,508,688 B2
(45) Date of Patent: Dec. 17, 2019

(54) BEARING DEVICE AND METHOD OF MANUFACTURING THE SAME

(71) Applicant: OTICS CORPORATION, Nishio-shi, Aichi (JP)

(72) Inventors: Hideki Oka, Handa (JP); Eiichi Nozaki, Nishio (JP); Haruyasu Tanaka, Nishio (JP); Naoyuki Yamane, Nishio (JP)

(73) Assignee: OTICS CORPORATION, Nishio-Shi, Aichi (JP)

( * ) Notice: Subject to any disclaimer, the term of this patent is extended or adjusted under 35 U.S.C. 154(b) by 68 days.

(21) Appl. No.: 14/919,197

(22) Filed: Oct. 21, 2015

(65) Prior Publication Data
US 2016/0131193 A1   May 12, 2016

(30) Foreign Application Priority Data
Nov. 10, 2014  (JP) .................................. 2014-227776

(51) Int. Cl.
*F16C 35/06* (2006.01)
*F16C 35/10* (2006.01)
(Continued)

(52) U.S. Cl.
CPC .......... *F16C 35/063* (2013.01); *B23P 15/003* (2013.01); *F02M 59/102* (2013.01);
(Continued)

(58) Field of Classification Search
CPC ........ F16C 35/063; F16C 17/02; F16C 33/02; F16C 35/10; F16C 43/02; F16C 2226/52;
(Continued)

(56) References Cited

U.S. PATENT DOCUMENTS 264,502 A  *  9/1882  Woolson ................. F16B 19/06
213/156
2,033,361 A  *  3/1936  Taylor ..................... F16G 13/02
29/509
(Continued)

FOREIGN PATENT DOCUMENTS

CN   102421994 A   4/2012
DE   10 2006 054406 A1   5/2008
(Continued)

OTHER PUBLICATIONS

Search Report for European Patent Application No. 15 002 795.1 dated Apr. 4, 2016 (8 pages).
(Continued)

*Primary Examiner* — Alan B Waits
(74) *Attorney, Agent, or Firm* — Smith, Gambrell & Russell, LLP

(57) ABSTRACT

A bearing device includes a support having a bearing hole, a shaft member slidably inserted into the bearing hole thereby to be rotatably supported by the support, the shaft member having an axial end surface and a locking part located on the axial end surface of the shaft member to protrude in an axial direction of the shaft member from an outer periphery of the axial end surface of the shaft member. The locking part is deformed by force applied to its axial protruding end so as to bulge outward in a radial direction intersecting the axial direction, so that the bulging part is capable of being locked to a peripheral part of the bearing hole on an outer surface of the support.

8 Claims, 7 Drawing Sheets

(51) Int. Cl.
*F16C 17/02* (2006.01)
*F16C 35/063* (2006.01)
*F02M 59/10* (2006.01)
*F16C 43/02* (2006.01)
*F16C 33/02* (2006.01)
*B23P 15/00* (2006.01)
*F02M 59/44* (2006.01)

(52) U.S. Cl.
CPC ............ *F02M 59/44* (2013.01); *F16C 17/02* (2013.01); *F16C 33/02* (2013.01); *F16C 35/10* (2013.01); *F16C 43/02* (2013.01); *F16C 2226/52* (2013.01)

(58) Field of Classification Search
CPC .... F16B 17/00; F16B 17/006; Y10T 29/4992; Y10T 29/49293; Y10T 29/49911; B23P 11/005; B23P 15/003; F02M 59/102; F02M 59/44
See application file for complete search history.

(56) References Cited

U.S. PATENT DOCUMENTS

| | | | | |
|---|---|---|---|---|
| 3,415,580 A * | 12/1968 | Malmsten | ............... | B23P 11/00 29/512 |
| 4,130,369 A * | 12/1978 | Wojcik | ................... | F16B 19/02 29/526.2 |
| 4,221,041 A * | 9/1980 | Hufnagl | ................... | B21J 15/02 29/512 |
| 4,628,874 A | 12/1986 | Barlow | | |
| 4,969,261 A * | 11/1990 | Igarashi | ................. | F01L 1/181 29/512 |
| 5,054,440 A * | 10/1991 | Kadokawa | ............. | F01L 1/143 123/90.39 |
| 5,099,807 A | 3/1992 | Devine | | |
| 5,359,765 A * | 11/1994 | Auriol | ................... | F16B 19/08 29/512 |
| 5,375,323 A | 12/1994 | Sata | | |
| 5,651,172 A * | 7/1997 | Auriol | ...................... | B21J 15/02 29/512 |
| 5,727,276 A * | 3/1998 | Brundula | .............. | A47L 9/0455 15/179 |
| 5,816,207 A * | 10/1998 | Kadokawa | ............. | F01L 1/047 123/90.42 |
| 6,113,279 A * | 9/2000 | Sawai | ..................... | B60B 27/00 384/537 |
| 6,698,081 B2 * | 3/2004 | Oates | .................... | F16B 33/002 29/509 |
| 6,751,841 B2 * | 6/2004 | Schnabel | .............. | B21J 15/043 29/524.1 |
| 6,845,686 B2 * | 1/2005 | Tsuchiyama | ............ | F01L 1/181 384/625 |
| 7,010,845 B2 * | 3/2006 | Muller | ...................... | F16B 5/02 29/509 |
| 9,283,606 B2 * | 3/2016 | Oka | ......................... | B21D 9/00 |
| 2007/0006944 A1 * | 1/2007 | Waseda | ................... | F16C 33/34 148/320 |
| 2009/0314236 A1 | 12/2009 | Meisborn | | |
| 2011/0005073 A1 | 1/2011 | Meisborn et al. | | |
| 2013/0340695 A1 | 12/2013 | Fujii et al. | | |

FOREIGN PATENT DOCUMENTS

| | | |
|---|---|---|
| DE | 10 2009 032143 A1 | 1/2011 |
| EP | 2 677 124 A1 | 12/2013 |
| JP | S59-029818 | 2/1984 |
| JP | 2005-012917 | 1/2005 |
| JP | 2007-009817 | 1/2007 |
| JP | 2007-138397 | 6/2007 |
| JP | 2014-001706 A | 1/2014 |

OTHER PUBLICATIONS

Chinese Office Action dated Jul. 20, 2017 for Chinese Patent Application No. 201510764972.2 (14 pages—Chinese with English translation).

* cited by examiner

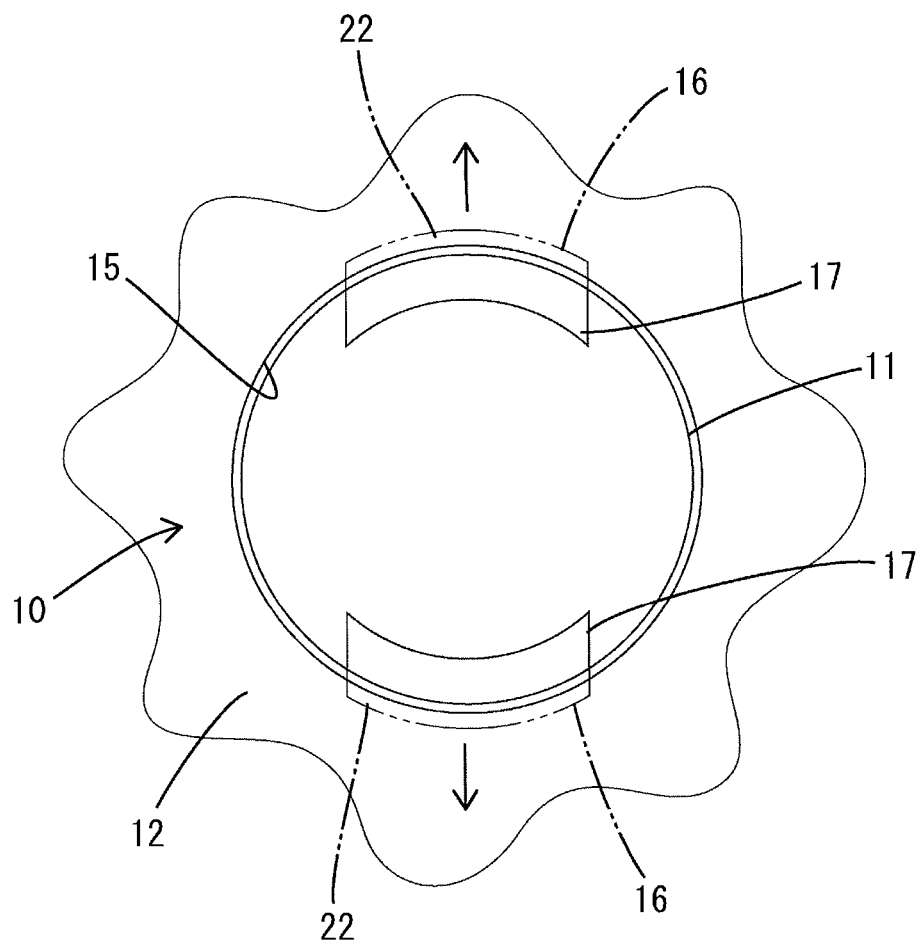

BEARING DEVICE AND METHOD OF MANUFACTURING THE SAME

CROSS-REFERENCE TO RELATED APPLICATIONS

This application is based upon and claims the benefit of priority from the prior Japanese Patent Application No. 2014-227776 filed on Nov. 10, 2014, the entire contents of which are incorporated herein by reference.

BACKGROUND

1. Technical Field

The present invention relates to a bearing device and a method of manufacturing the bearing device.

2. Related Art

For example, Japanese Patent Application Publication No. JP-A-2014-1706 discloses a roller lifter (a bearing device) suitable for use with an internal combustion engine. The roller lifter has a bearing part including a pivot pin (a shaft member) rotatably supporting a roller and a pair of supporting parts (supports) supporting the pivot pin. The pivot pin is swaged to be fixed in position while both axial ends thereof are fitted in support holes formed in the respective supporting parts.

In the above-described construction, the pivot pin is fixed to the supporting parts so as to be circumferentially non-rotatable. Accordingly, the bearing part has a load area (a range receiving radial load) unevenly distributed in a part of the pivot pin (the side abutting against a cam). This is one of factors accelerating fatigue progress in the load area and reducing the service life of the bearing part. Further, force applied from the pivot pin to the supporting parts is increased during the swaging, so that there is a possibility of deformation of the supporting parts in the direction of force application.

SUMMARY

The present invention was made in view of the foregoing circumstances and an object thereof is to provide a bearing device which has an improved service life and which can reduce deformation during manufacture and a method of manufacturing the bearing device.

The present invention provides a bearing device including a support having a bearing hole, a shaft member slidably inserted into the bearing hole thereby to be rotatably supported by the support, the shaft member having an axial end surface, and a locking part provided on the axial end surface of the shaft member to protrude in an axial direction of the shaft member from an outer periphery of the axial end surface of the shaft member. The locking part is deformed by force applied to an axial protruding end thereof so as to bulge outward in a radial direction intersecting the axial direction, so that the bulging part is capable of being locked to a peripheral part of the bearing hole on an outer surface of the support.

Since the shaft member is slidably inserted into the bearing hole thereby to be rotatably supported by the support, the area of load acting on the shaft member changes in a circumferential direction. As a result, the service life of the bearing device can be improved. Further, since the shaft member is not firmly fixed to the support, deformation of the support can be prevented. Furthermore, the locking part is deformed by the force applied to the axial protruding end thereof, so as to bulge radially outward. Since the bulging part is capable of being locked to the peripheral part of the bearing hole on the outer surface of the support, the bearing device can be manufactured more easily and an amount of bulge (amount of deformation) of the locking part can be fine-adjusted.

The invention also provides a method of manufacturing a bearing device, including inserting a shaft member into a bearing hole of a support, locating a protrusion outside the support, the protrusion protruding in an axial direction of the shaft member from an outer periphery of an axial end surface of the shaft member and pressurizing a protruding end surface of the protrusion by an upsetting die thereby to obtain a part deformed to bulge outward with respect to a radial direction intersecting the axial direction, and locating the deformed part so that the deformed part is capable of being locked to a peripheral part of the bearing hole on an outer surface of the support, thereby forming a locking part.

According to the above-described method, the protruding end surface of the protrusion is pressurized by the upsetting die, with the result that the locking part can be formed more easily.

BRIEF DESCRIPTION OF THE DRAWINGS

In the accompanying drawings:

FIG. 7 is a view of the bearing device according to a third embodiment, explaining the processing of the shaft member.

DETAILED DESCRIPTION

Several embodiments will be described with reference to the accompanying drawings. Referring to FIGS. 1 to 5, a first embodiment of the bearing device is shown. The bearing device is exemplified as a roller lifter 60 for an internal combustion engine in the first embodiment. A bearing part 10 of the roller lifter 60 will be described in detail in the following description.

Figure 5:
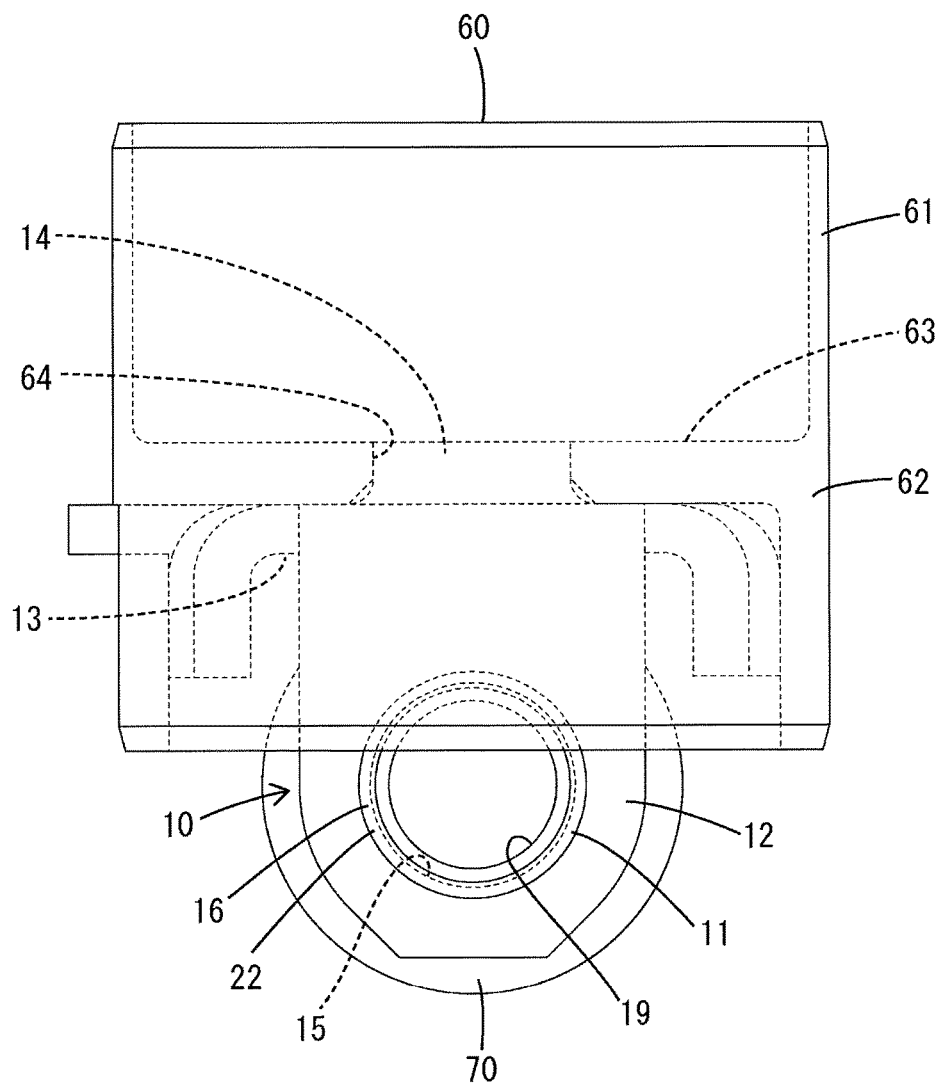
FIG. 5 is a front view of a roller lifter comprising the bearing device.

The roller lifter 60 has a lifter body 61 on which the bearing part 10 is to be mounted, as shown in FIG. 5. The lifter body 61 has a generally cylindrical peripheral wall 62 open in an up-down direction as viewed in FIG. 5 and a flat plate-shaped partition wall 63 which is mounted on a vertically middle part of an inner peripheral surface of the peripheral wall 62 in order to vertically partition an interior inside the peripheral wall 62. The partition wall 63 includes a central part formed with a through connecting hole 64 having a circular cross-section.

The bearing part 10 includes a shaft-shaped, more specifically, cylindrical pin-shaped shaft member 11 rotatably supporting a roller 70 via a rolling body (not shown) and a pair of flat plate-shaped supports 12 supporting both ends of the shaft member 11 respectively. Only one of the supports 12 is shown in FIG. 5. Both supports 12 have respective upper ends connected to each other by a connecting part 13, so that the supports 12 and the connecting part 13 are generally formed into an arch shape. The connecting part 13 is provided with a connecting protrusion 14 which is inserted into the connecting hole 64 and swaged to be fixed in position. The bearing part 10 is connected via the connecting protrusion 14 to the lifter body 61 so as to be prevented from slipout. Although the bearing part 10 and the lifter body 61 are independent of each other in the embodiment, these may be formed integrally with each other, instead.

A plunger is inserted into the lifter body 61 from above and a cam abuts, from below, against the roller 70 supported on the shaft member 11, although the plunger and the cam are not shown in the drawings. Upon rotation of the cam, the lifter body 61 is reciprocally moved in the up-down direction in the cylinder. In this case, a stroke of the reciprocal movement of the lifter body 61 depends upon an amount of cam lift. With reciprocal movement of the lifter body 61, the plunger is also reciprocated, so that fuel can be pressure-fed to an injector and the like.

Figure 4:
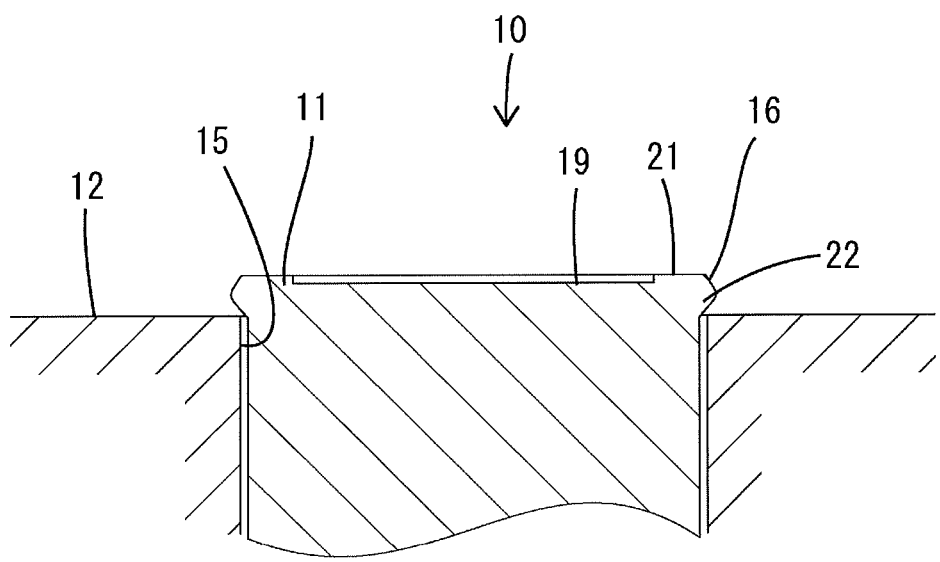
FIG. 4 is a cross-sectional view of the bearing device, showing the state after the processing of the shaft member.

Describing the bearing part 10 in more detail, each support 12 is provided with a bearing hole 15 formed therethrough and having a circular cross section, as shown in FIG. 4. The shaft member 11 is slidably inserted into the bearing hole 15. The shaft member 11 is rotatably supported on the support 12 via the bearing hole 15. The shaft member 11 has two ends each one of which is provided with a locking part 16 which protrudes to the outer surface side of the support 12 so as to be capable of being locked to a peripheral part of the bearing hole 15 on an outer surface of the support 12.

Figure 1:
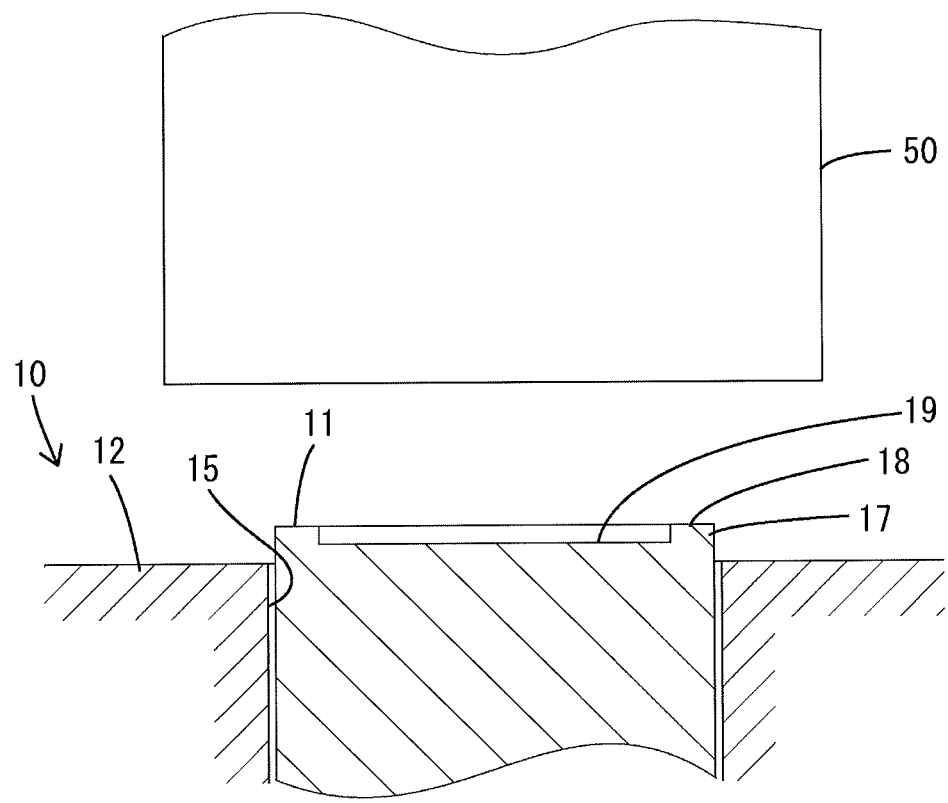
FIG. 1 is a cross-sectional view of the bearing device according to a first embodiment, showing the state before the processing of a shaft member.

The shaft member 11 previously has an axial end surface provided with a protrusion 17 which axially protrudes from an outer periphery of the shaft member 11 and has an annular cross section, as shown in FIG. 1. An upsetting process is carried out for the protrusion 17 by applying force to the protrusion 17 from an opposite side in a protruding direction, so that the protrusion 17 is pressure-deformed so as to bulge outward in the radial direction intersecting an axial direction with the result that the locking part 16 is formed.

The protrusion 17 represents a state of the locking part 16 before pressure deformation. The protrusion 17 is formed so that an outer periphery thereof is axially continuous with other parts of the outer periphery of the shaft member 11 in a stepless manner and is perpendicular to a flat protruding end surface 18. The axial end surface of the shaft member 11 is formed with a recess 19 having a circular cross section. The recess 19 is circumferentially defined by the protrusion 17 or the locking part 16. The recess 19 has a depth equal to an amount of axial protrusion of the protrusion 17 or the locking part 16 and becomes shallow by pressure deformation from the protrusion 17 to the locking part 16.

Figure 3:
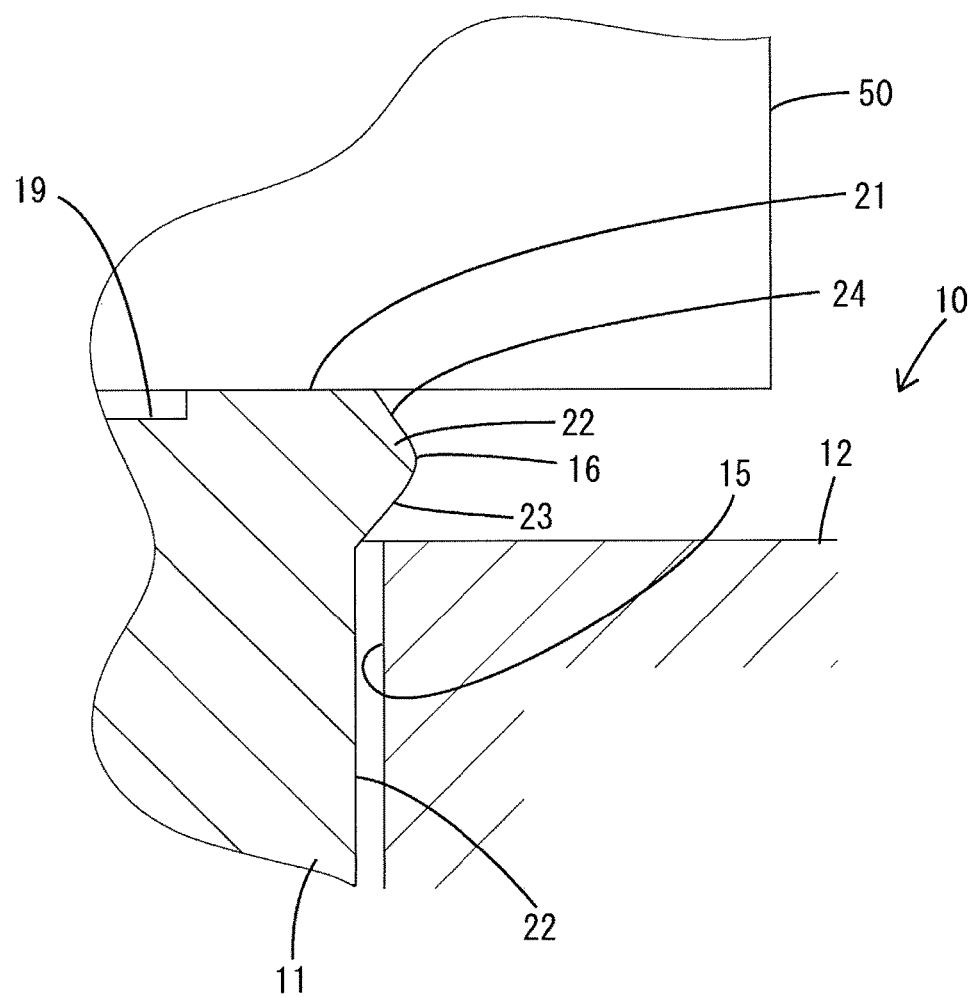
FIG. 3 is a partially enlarged view of the bearing device as shown in FIG. 2.

The locking part 16 has a protrusion end surface 21 which abuts against a die 50 for use with an upsetting machine thereby to be pressurized with the result that the protrusion end surface 21 is formed to be flat, as shown in FIG. 3. The locking part 16 has a bulge 22 located between the protrusion end surface 21 and the aforementioned other part of the outer periphery of the shaft member 11. The bulge 22 bulges radially outward and has a substantially triangular section or a convexly curved section. The bulge 22 is disposed to be abuttable against or to be oppositely spaced away from an opening edge of the bearing hole 15 in the outer surface of the support 12. When the shaft member 11 is displaced in a direction such that the shaft member 11 slips out of the bearing hole 15, the bulge 22 abuts against the opening edge of the bearing hole 15 to serve to prevent the shaft member 11 from slipping out of the bearing hole 15.

The bulge 22 has a side surface formed with first and second inclined surfaces 23 and 24 both of which are inclined relative to an axial direction, as shown in FIG. 3. The first inclined surface 23 is inclined downward as viewed in FIG. 3, facing the opening edge of the bearing hole 15 so as to be abuttable against the opening edge. The second inclined surface 24 is inclined upward as viewed in FIG. 3, obtusely intersecting with and being continuous with the protruding end surface 21.

Figure 2:
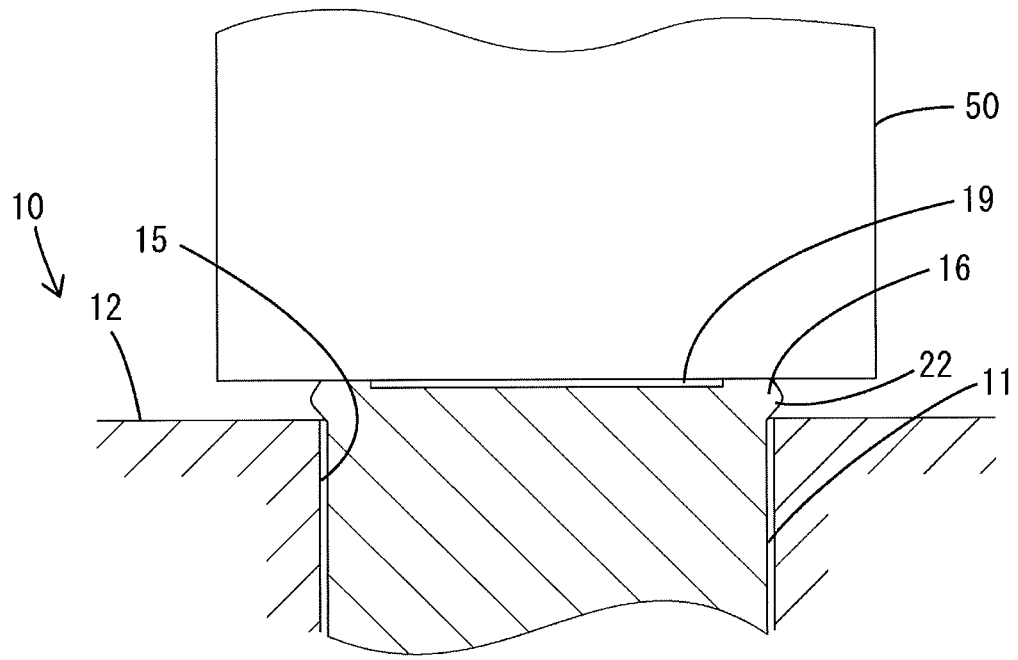
FIG. 2 is a cross-sectional view of the bearing device, showing the state during the processing of the shaft member.

A method of manufacturing the bearing part 10 will now be described. Prior to the upsetting process, a thermal refining process is applied to the shaft member 11 to set the hardness of the shaft member 11 to a range from 60 to 64 HRC. Subsequently, the shaft member 11 is inserted into the bearing holes 15 of the supports 12, and the protrusion 17 protruding from the axial end surface of the shaft member 11 is located outside outer surfaces of the supports 12, as shown in FIG. 1. In this state, the die 50 of the upsetting machine is descended along the axial direction from above as viewed in FIG. 1. The die 50 is pressed against the protruding end surface 18 of the protrusion 17 so that the protruding end surface 18 is pressurized, as shown in FIGS. 2 and 3. Since the protrusion 17 is formed into an annular shape and protrudes from the axial end surface of the shaft member 11, the protrusion 17 has a property that an inner periphery side thereof has a higher stiffness and an outer periphery side thereof is deformable more easily. Accordingly, when the protrusion 17 is axially compressed and radially extended, the locking part 16 is formed so that the diameter of the bulge 22 is spread axially outward. When the locking part 16 is thus formed, the first inclined surface 23 of the bulge 22 faces the opening edge of the bearing hole 15 in the outer surface of the support 12 so as to cover the opening edge of the bearing hole 15 over an entire circumference thereof from outside, as shown in FIG. 3. Accordingly, even when the shaft member 11 is axially pulled out, the first inclined surface 23 of the bulge 22 abuts against the opening edge of the bearing hole 15 over the entire circumference, with the result that the shaft member 11 is reliably prevented from slipping out of the support 12.

According to the bearing part 10 formed in the above-described method, the shaft member 11 is rotatively displaced relative to the supports 12 while sliding in the circumferential direction on the inner periphery of the bearing hole 15 upon rotation of the roller 70. Accordingly, a load area of the shaft member 11 changes in the circumferential direction without being limited to a predetermined range. As a result, the service life of the shaft member 11 and accordingly the service life of the bearing part 10 can be rendered longer. Further, differing from the conventional roller lifter, the bearing part 10 includes the shaft member 11 which is not swaged to the opening edge of the bearing hole 15 in the outer surface of the support 12. As a result, there is less possibility that the support 12 may be deformed so as to be leaned with the connection position of the support 12 and the connecting part 13 as a fulcrum.

As described above, the shaft member 11 is rotatably supported on the supports 12 in the foregoing embodiment. This changes the area of load applied to the shaft member 11, with the result that the bearing life can be improved. Further, since the shaft member 11 is not substantially fixed to the supports 12, deformation of the supports 12 can be prevented.

Furthermore, pressure is axially applied to the protruding end surface 18 of the protrusion 17 by the upsetting process, whereupon the protrusion 17 is deformed so that the diameter thereof is increased radially outward, with the result that the bulge 22 is formed. Since the bulge 22 is capable of being locked to the peripheral part of the bearing hole 15 on the outer surface of the support 12, the bearing device can be manufactured more easily, and an amount of bulge and shape of the bulge 22 can be fine-adjusted. Moreover, since the locking part 16 is formed on the outer periphery of the axial end surface of the shaft member 11 over an entire circumference, the shaft member 11 can stably be supported on the supports 12 so as to be retained or prevented from slipping out of the supports 12.

Figure 6:
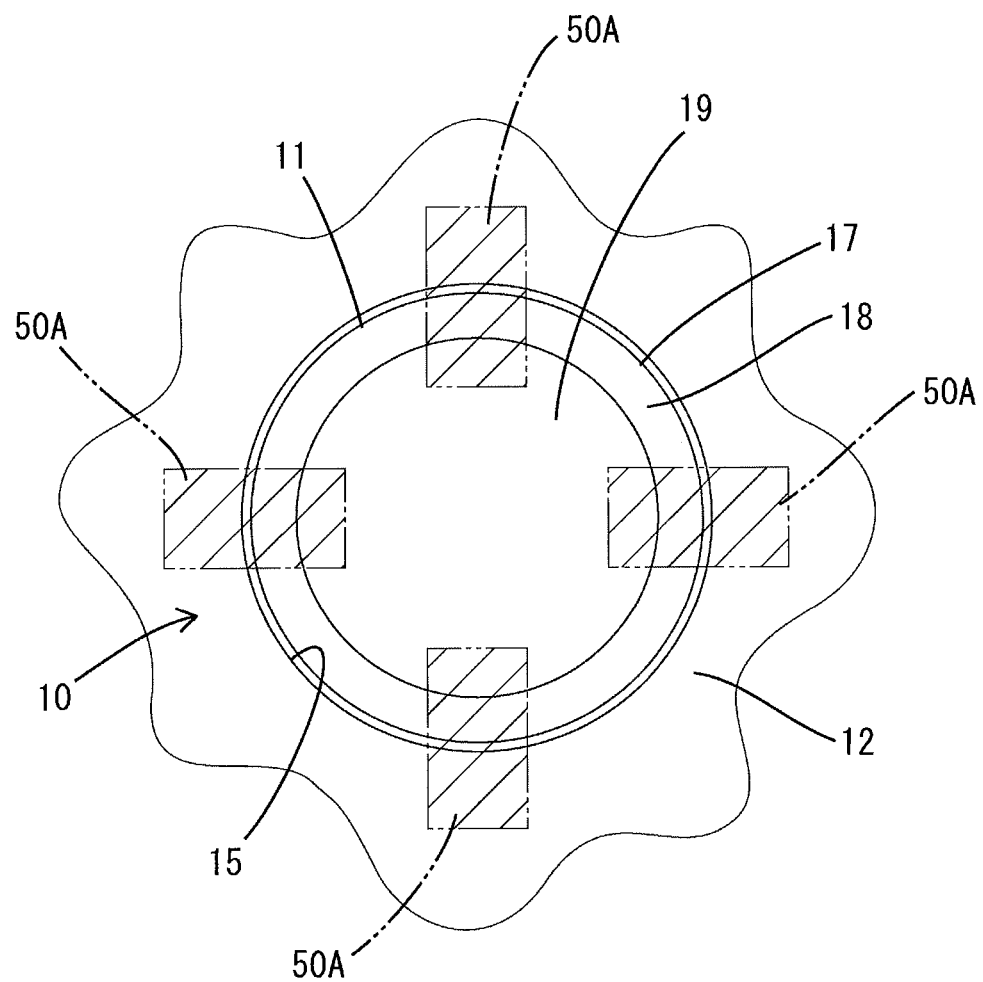
FIG. 6 is a view of the bearing device according to a second embodiment, explaining the processing of the shaft member.

FIG. 6 illustrates a second embodiment. Identical or similar parts in the second embodiment are labeled by the same reference symbols as those in the first embodiment, and the description of these identical or similar parts will be eliminated. The second embodiment differs from the first embodiment in that the locking part 16 is formed on a partial circumferential part of the protrusion 17 in the second embodiment. The locking part in the second embodiment is not shown in FIG. 6. However, since the locking part in the second embodiment has the same cross-sectional shape as the locking part 16 in the first embodiment, the same reference symbol "16" will be affixed to the locking part in the second embodiment.

In the second embodiment, too, the outer periphery of the axial end surface of the shaft member 11 is formed with the annular protrusion 17 axially protruding over an entire circumference in the state before execution of the upsetting process, in the same manner as in the first embodiment.

Split dies 50A circumferentially provided on the upsetting machine are pressed against a plurality of circumferentially spaced parts of the protrusion end surface 18 of the protrusion 17, more specifically, four parts circumferentially spaced at regular intervals, respectively. Consequently, the protrusion 17 is deformed so that the diameter thereof is increased such that the four circumferentially spaced parts thereof bulge radially outward, with the result that the locking part 16 is formed which faces the opening edges of the bearing holes 15 on the outer surface of the support 12 from four circumferential parts. Thus, when locking parts 16 are formed on the outer periphery of the axial end surface of the shaft member 11 so as to be circumferentially spaced from one another, the shaft member 11 can efficiently be blocked at a predetermined position from slipout from the supports 12, and the locking parts 16 can easily be formed.

FIG. 7 illustrates a third embodiment. The third embodiment differs from the first and second embodiments in that the locking parts 16 and the protrusions 17 are formed on the outer periphery of the axial end surface of the shaft member 11 so as to be spaced circumferentially. Since the locking parts and the protrusions in the third embodiment have the same cross-sectional shapes as the locking part 16 and the protrusion 17 in the first and second embodiments, the same reference symbols "16" and "17" will be affixed to the locking parts and the protrusions 17 in the third embodiment.

Two protrusions 17 are provided on two circumferentially spaced parts, more specifically, on two circumferentially equally spaced parts on the outer periphery of the axial end surface of the shaft member 11, so as to protrude axially, respectively. Two locking parts 16 are provided on two circumferentially spaced parts, more specifically, on two circumferentially equally spaced parts on the outer periphery of the axial end surface of the shaft member 11, so as to protrude axially and so as to have bulges 22 bulging radially outward, respectively. Accordingly, each one of the locking parts 16 and each one of the protrusions 17 are formed to have an arc-shaped section according to the outer periphery of the axial end surface of the shaft member 11. In the third embodiment, the locking parts 16 are formed by the same die 50 of the upsetting machine as used in the first embodiment. However, the locking parts 16 may be formed by the split dies 50A of the upsetting machine based on the second embodiment in which force is applied to only the positions corresponding to the respective locking parts 16.

The bearing device of the invention should not be limited to the roller lifter 60 but may be applied to valve lifters provided in valve gears, for example. Further, an interposition such as a rolling element may be provided between an inner periphery of the bearing hole 15 of the support member 12 and the shaft member 11. Further, at least two locking parts 16 may be provided in the circumferential direction but may not be disposed at regular intervals.

What is claimed is:

1. A bearing device comprising:
a support having a bearing hole;
a shaft member received in the bearing hole as to be rotatably supported by the support, the shaft member having an axial end surface; and
a locking part provided on the axial end surface of the shaft member to protrude in an axial direction of the shaft member from an outer periphery of the axial end surface of the shaft member, the locking part bulging outward in a radial direction intersecting the axial direction, so that the bulging locking part is capable of being locked to a peripheral part of the bearing hole on an outer surface of the support,
wherein the axial protruding end of the locking part is disposed on the outer periphery of the axial end surface of the shaft member to be located axially higher than an inner periphery of the axial end surface of the shaft member the axial protruding end of the locking part having a horizontal geometry that is radially flat;
wherein the inner periphery of the axial end surface of the shaft member is provided with a recess having a circular cross section and a circumference defined by the locking part; and
wherein the recess has an equal depth across the inner periphery of the axial end surface of the shaft member.

2. The bearing device according to claim 1, wherein the locking part is formed on the outer periphery of the axial end surface of the shaft member over an entire circumference of the shaft member.

3. The bearing device according to claim 1, wherein a plurality of the locking parts is formed on the outer periphery of the axial end surface of the shaft member so as to be circumferentially spaced from each other.

4. A method of manufacturing the bearing device according to claim 1, comprising:
slidably inserting the shaft member into the bearing hole of the support;
locating a protrusion part of the shaft outside the support, the protrusion part protruding in the axial direction of the shaft member from the outer periphery of the axial end surface of the shaft member; and
pressurizing the protruding end surface of the protrusion part by a flat surface of an upsetting die to form the bulging locking part; and
locating the bulging locking part so that the bulging locking part is capable of being locked to the peripheral part of the bearing hole on the outer surface of the support, thereby forming a locking relationship between the bulging locking part and the peripheral part of the bearing hole.

5. The method according to claim 4, wherein a thermal refining process is applied to the shaft member.

6. The method according to claim 5, wherein the thermal refining process is carried out prior to inserting the shaft member into the bearing hole.

7. The bearing device according to claim 1, wherein the locking part has a radial thickness set to be largest at a radial distal end of the bulging locking part.

8. The bearing device according to claim 1, wherein the shaft member is configured to rotatably support a roller.

* * * * *